Patented Oct. 27, 1925.

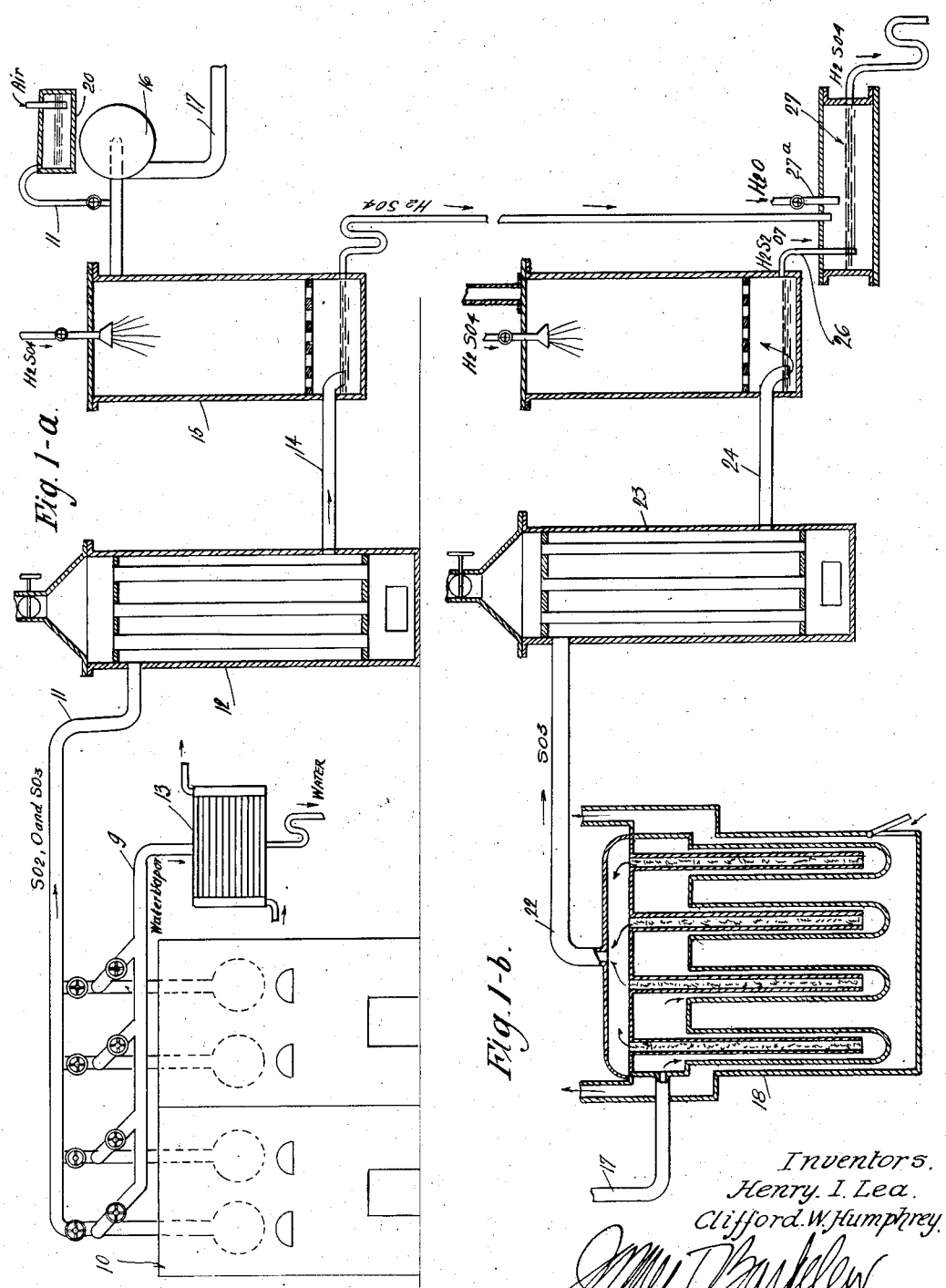

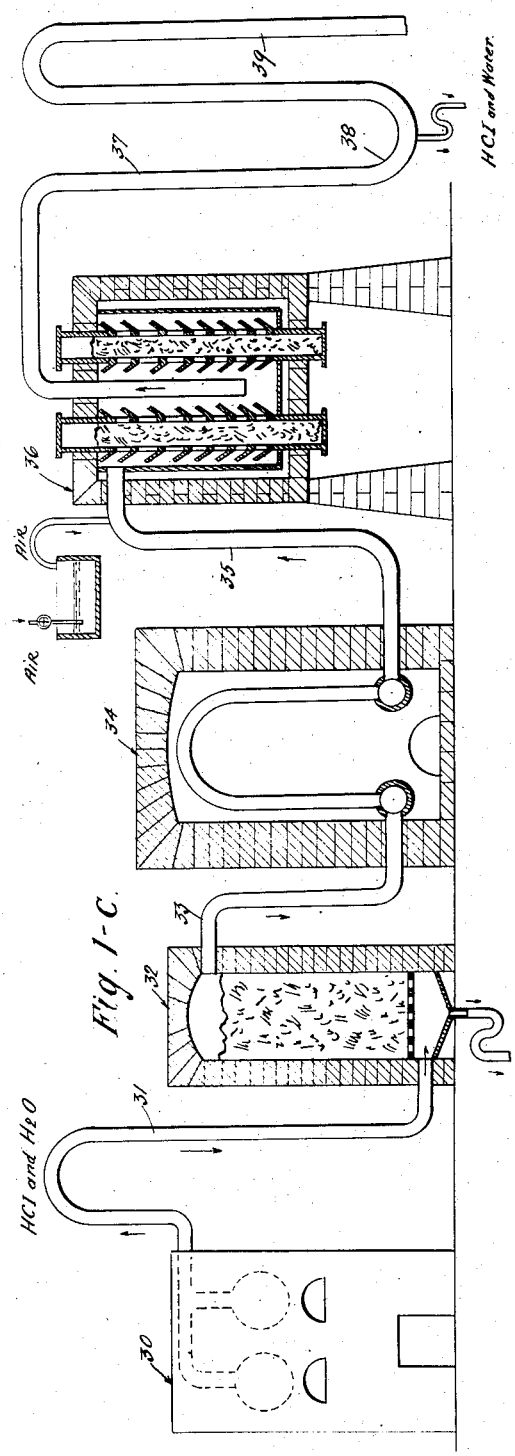
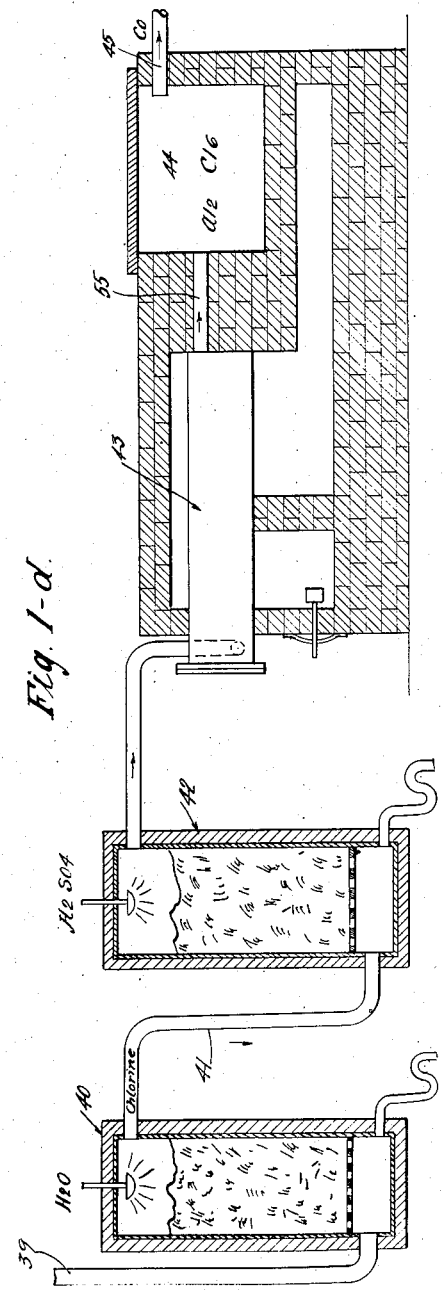

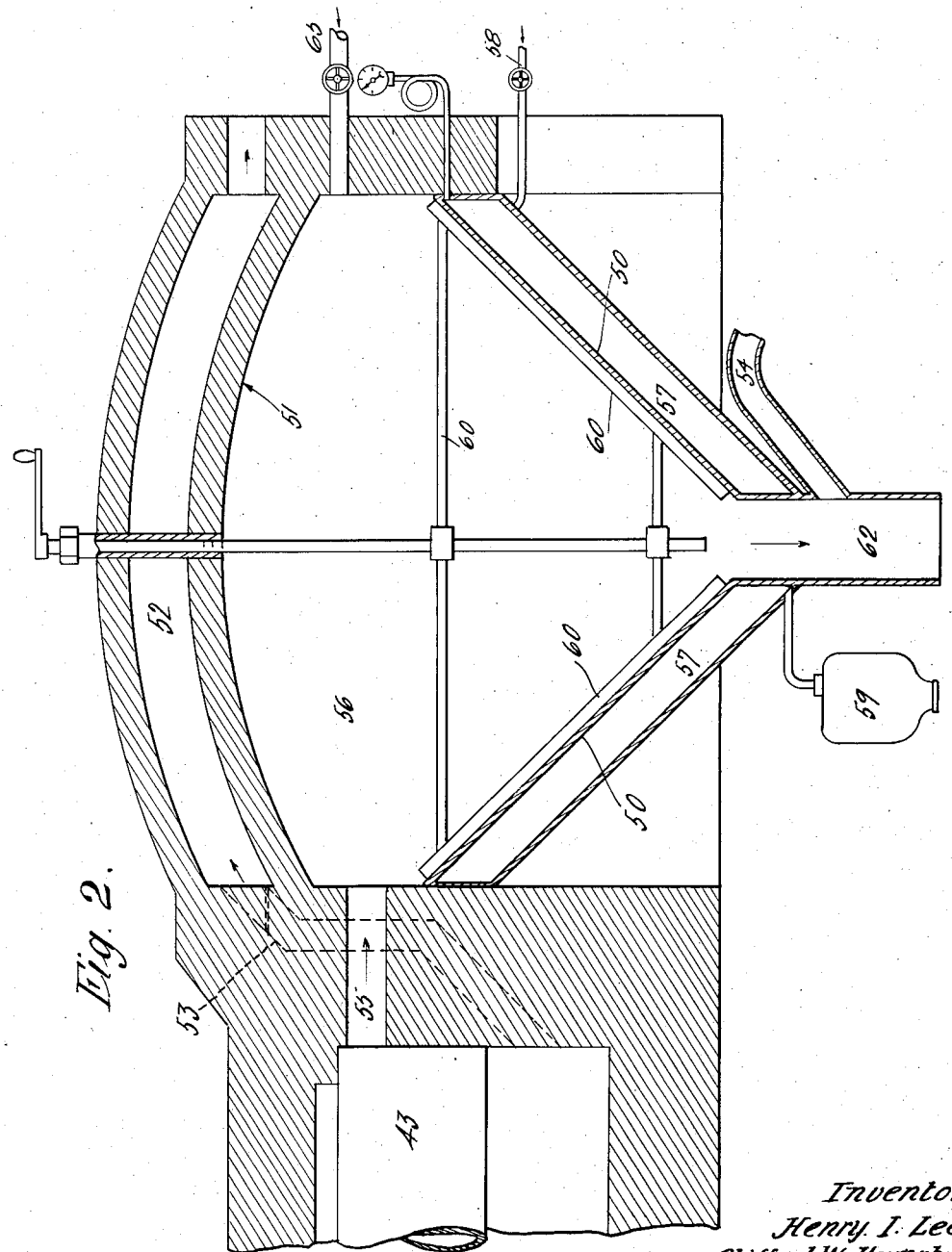

1,558,897

UNITED STATES PATENT OFFICE.

HENRY I. LEA, OF SANTA MONICA, AND CLIFFORD W. HUMPHREY, OF BURLINGAME, CALIFORNIA.

ALUMINUM CHLORIDE PROCESS.

Application filed June 20, 1923. Serial No. 646,556.

*To all whom it may concern:*

Be it known that we, HENRY I. LEA and CLIFFORD W. HUMPHREY, residing at Santa Monica, in the county of Los Angeles and State of California, and Burlingame, in the county of San Mateo and State of California, respectively, have jointly invented new and useful Improvements in Aluminum Chloride Processes, of which the following is a detailed specification.

This invention relates to processes for the production principally of aluminum chloride. The present general object of the invention concerned in this application and in several co-pending and companion applications, hereinafter identified, is the economical production of anhydrous aluminum chloride (hereinafter referred to simply as aluminum chloride); but the process as hereinafter described also produces other products of some value. Consequently, although aluminum chloride is at present the most valuable product of the process, and although for that reason we term our process one for producing aluminum chloride, it is not to be understood that it may not be an object or perhaps under other conditions the principal object, to produce one or more of the other products of the process.

There are various procedures differing somewhat from each other by which our process may be carried out; the process as a whole will be best understood from the following detailed descriptions of preferred methods, rather than from any general statement that we may make in advance. However, for the purpose of generally distinguishing the processes of the several applications from each other we will make a general and preliminary statement of the distinguishing features of the several variations. It will be understood nevertheless that this statement is not intended in the least as a restriction or limitation upon the invention either as a whole or as to the specific aspects herein claimed, but is intended only to give a clear idea of the lines of demarkation of the several specific variations of the fundamental process and as between the specific claims of the several co-pending applications. This application is in part a divisional continuation of our application on "aluminum chloride process" filed May 31st, 1922, Serial No. 564,762. In that application we have described a process including steps that may be said, in a broad way, to amount to the chlorination of a more or less dehydrated or more or less dehydrated and decomposed aluminum sulphate; and the specific variations in the methods have to do with various ways and means of effecting successive operations; as for instance, the ways and means for obtaining the chlorine for the chlorination reaction, or the specific ways and means of treating the original aluminum sulphate, as to whether it is decomposed or not before being chlorinated.

When we refer herein to aluminum sulphate it will be understood that we include that substance in whatever form it may be used. For instance, it may be in ores that carry the sulphate in such state that the ores themselves may be put directly into our process; or it may be in ores that require pre-treatment to separate certain other matters; or it may be in ores that may be put directly into the process and that may require one or two additional steps during the process. Such for instance, is the ore alunite, an aluminum and potassium sulphate ore; and how such an ore may be treated is hereinafter set out.

A typical form of the general process may, for the purpose of this preliminary general statement, be described as follows:—
We take an aluminum sulphate or an aluminum sulphate carrying ore, and if it has not been previously dehydrated, we first dehydrate it. Then by subjection to suitable temperature we decompose the sulphate into aluminum oxide and a sulphur and oxygen compound or compounds. For instance, the sulphur and oxygen may either come off as $SO_3$ or $SO_2$ and O. Then we chlorinate that oxide that we have obtained by decomposing the sulphate. This general aspect of the process is the subject matter of a co-pending companion application Serial No. 646,555 filed June 20, 1923; also divisional of said prior application, and that for purposes of identification we here term application "B". Just how and where the chlorine for chlorination is preferably obtained, during the steps of the process, is the particular subject matter of this present application; which, in this series, is identified as application "C"; and this will be adverted to later. The chlorination is carried out by subjecting the oxide, under suitable temperature, to the action of chlorine in the presence of carbon. The chlorine may be, and preferably is, in most variations of this process, free chlorine. But, as we will set out, the chlorination step may be carried on without the necessity of first obtaining free chlorine. This also will be spoken of later.

Whatever may be the immediate chlorinating agency, chlorination carried on in the presence of carbon is preferably carried on in the presence of hydrocarbons in the manner and with the resulting advantages as hereinafter explained. The process, in itself, of chlorinating an aluminum oxide or an aluminum oxide carrying ore, in the presence of hydrocarbons, or impregnated with hydrocarbons, is made the specific subject matter of the claims of said prior application, Serial No. 564,762, filed May 31, 1922, which for identification will be called in this series, application "A".

The chlorine for chlorination of the aluminum oxide produced by decomposition of the sulphate, is preferably obtained by using the sulphur and oxygen product of that decomposition to make hydrochloric acid or chlorine; and this may be done, as an illustration, through the step of making sulphuric acid. These procedures are capable of some variations and are generally the characteristic subject matter of this present application.

Then, in the process where an SO compound or sulphuric acid is produced (as for instance, in the form of the process where the sulphate is decomposed as described in this application and in application "B") the S and O compound, either directly or through the step of forming sulphuric acid, may be used either wholly or in part, to react upon some other aluminum compound, for instance, aluminum silicate, to produce more aluminum sulphate for the process. This may be very economically done, particularly where the sulphur and oxygen compound production is more than is required for the formation of the requisite amount of chlorinating agent. The variational feature of the process is the characteristic subject matter of companion application "D" (Serial No. 646,557 filed June 20, 1923).

As another variation, the sulphate may be chlorinated directly without decomposition; and this is subject matter of companion application E (Serial No. 646,558, filed June 20, 1923). And the sulphate may further be treated for decomposition, and the chlorinating agent also formed in what amounts to a single reaction, being in effect, a summation of the several chlorinating agent forming reactions that are the characteristic subject matter of this present application. For instance, instead of first decomposing the sulphate by a separate decomposing operation and then utilizing the sulphur and oxygen compound to produce a chlorinating agent and then using this chlorinating agent to chlorinate the oxide; we may treat the sulphate directly with water and chloride of an alkali metal, under proper temperature conditions, resulting in the formation of aluminum oxide and hydrochloric acid or chlorine and a sulphate of the alkali metal; and then the produced oxide may be chlorinated with the chlorinating agent. This last mentioned variation, somewhat closely allied to the subject matter of the present application, is the characteristic subject matter of the application of this series identified as application "F" (Serial No. 646,559 filed June 20, 1923).

All of the applications, herein identified as B to F inclusive, are divisional continuations, in part or in whole, of said application A, Serial No. 564,762. Since these divisional applications relate more particularly to certain variational forms of the process as hereinabove generally set out, we will in the specifications endeavor only to set out the several subject matters necessary for the complete understanding of the respective claimed inventions and for an understanding of the connection of the several divisional processes with each other. Accordingly, this present application has its descriptive matter directed more particularly to the process that involves characteristically the decomposition of the sulphate to produce an oxide and to the use of the S and O content for the production of a chlorinating agent with which the oxide is then chlorinated.

As will be readily understood, our process may be carried on in any suitable apparatus; and so it is only for the purpose of clarifying the following detailed description that we illustrate a suitable apparatus in the accompanying drawings. In these drawings there is a diagram which, for convenience of illustration, is divided into several figures as Fig. 1ª, Fig. 1ᵇ, Fig. 1ᶜ, Fig. 1ᵈ; and Fig. 2 is a section showing a form of chloride condensing chamber that may be used as herein explained.

*Method 1.*

This is the typical method that, with its variation, forms the subject matter of this application. In this method we take aluminum sulphate, and, placing it in a retort 10 heat it to a temperature sufficient to drive off its water of crystallization; so that we have the reaction:

I. $Al_2(SO_4)3 \cdot 18H_2O$ plus heat equals $Al_2(SO_4)3$ plus 18 (or less) $H_2O$.

We may say here that less than the maximum amount of water may be driven off, because the sulphate does not always contain the maximum amount; and also because it may be that this reaction, like others in the process may sometimes not go through to absolute completion. This will be generally understood in connection with all the following.

The product here is a dehydrated aluminum sulphate that may be removed from time to time, or preferably left in the retorts for the next decomposition reaction.

The retorts 10 may be arranged singly, in pairs or more in a set so as to provide for more or less continuous operation. The water vapor that passes off goes through pipe 9 into condenser 13 or may go directly to atmosphere.

Further application of heat to the dehydrated sulphate then causes it to break up into aluminum oxide, sulphur dioxide and oxygen (or the aluminum oxide and sulphur trioxide, as hereinafter explained) as follows:

II. $Al_2(SO_4)_3 + \text{heat} = Al_2O_3 + 3SO_2 + 3O$, or:

$Al_2(SO_4)_3 + \text{heat} = Al_2O_3 + 3SO_3$.

The temperature used for this reaction may vary: we have found that a red heat is suitable, and a dull red heat or even lower may be sufficient (say about 600° C. or above). The temperature used depends on the time element, the pressure (above or below atmosphere) maintained in the retort, and the extent of decomposition desired. We find that absolutely full decomposition is not necessary or practically desired.

The sulphur dioxide and oxygen from this operation pass through the pipe 11 to the cooler 12, which may be here an air or water cooler. The oxide may be removed from time to time to be put in the chlorinating retort; or chlorination, as hereinafter explained, may be carried on in the retorts 10.

Next the gases pass through pipe 14 to a drying and cleaning tower 15 of any suitable kind, through which the gases rise upwardly and through which sulphuric acid, or other drying medium, may be sprayed down from the top; and the gases next are drawn out by an exhauster 16 and passed through a pipe 17 into a catalyzer 18. At the same time this exhauster draws in atmospheric air through a valve controlled pipe 19, the air passing through a washer 20, to cleanse and dry it.

Catalyzer 18 is preferably of the type utilizing platinized asbestos. In this catalyzer the uncombined sulphur dioxide and oxygen are combined to form sulphur trioxide according to:

III. $3SO_2 + 3O + \text{catalyzer} = 3SO_3$.

The oxygen theoretically required for this reaction may be fully supplied by the oxygen from the last preceding reaction; but we find that an excess of oxygen (supplied here by the air) makes the reaction go on more fully.

The catalyzer may be kept at the most efficient temperature with air that passes through its air jacket 21; and the heated air that comes off the catalyzer may be used at any convenient place in the process, for instance, for combustion under one or more of the retorts. We find the best catalyzer temperature to be about 450° C.; it may be necessary in starting to warm the catalyzer, and then, when in operation, to somewhat cool it to maintain this temperature.

From the catalyzer 18 the sulphur trioxide passes through pipe 22 to another cooler 23 which may be either air or water cooled. We may state here that wherever a cooler is used in this process it may be desirable to use an air cooler as we thereby can more readily use the heat in the furnaces. From the cooler the sulphur trioxide passes through pipe 24 into an absorption tower 25. In the absorption tower the gases pass upwardly and sulphuric acid is sprayed downwardly; with the result that fuming sulphuric acid is formed, and this sulphuric acid collecting in the bottom of the tower passes out through pipe 26 into a storage chamber 27 to which water may be controllably fed through 27ª to change the fuming sulphuric into ordinary sulphuric of 66° B. gravity.

These reactions are thus represented: (if they go to completion)

$3SO_3 + 3H_2SO_4 = 3H_2S_2O_7$.
$3H_2S_2O_7 + 3H_2O = 6H_2SO_4$.

Half this sulphuric acid is put back into absorption tower 25, thus leaving half the sulphuric acid ($3H_2SO_4$) in 27. Thus the summation of these two reactions may be written:

IV. $3SO_3 + 3H_2O = 3H_2SO_4$.

If conditions in retort 10 have been such as to produce $SO_3$ instead of $SO_2$ and O, or to partially produce $SO_3$, then that $SO_3$ will, with sulphuric acid in 15, become $H_2S_2O_7$. If $SO_3$ is produced entirely in retort 10, then catalyzer 18 and cooler 23 and absorption tower 25 can be dispensed with; the $H_2S_2O_7$ going directly from 15 to 27.

Then into a retort or salt cake pan 30 that is heated to about the same temperature as the first retort we introduce chloride of an alkali metal, for instance, sodium chloride and the sulphuric acid, in proper proportions for the following reaction which then takes place:

V. 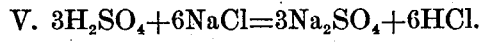 $3H_2SO_4 + 6NaCl = 3Na_2SO_4 + 6HCl$.

In this operation the chloride of sodium, potassium, calcium, magnesium or manganese may be used. If we use sodium chloride the result of this operation is to produce sodium sulphate and hydrochloric acid. The sodium sulphate is left in the retorts until the charge is exhausted while the hydrochloric acid gas passes through pipe 31 into a drying chamber 32. This drying chamber may be of brick construction filled with coke. The dried hydrochloric acid vapor then passes through pipe 33 into a heater 34. This heater may be heated with waste gases from the retorts. Then the dry heated HCl gas passes through pipe 35 to the second catalyzer 36 charged with broken brick, coke, pumice stone, or other suitable material well soaked with a solution of $CuCl_2$ or other suitable catalyzing material. This catalyzer 36 is kept at a temperature of about 450° C., and also there is supplied to this catalyzer a suitable amount of air or oxygen so that the following takes place:

VI. 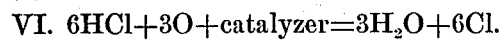 $6HCl + 3O + catalyzer = 3H_2O + 6Cl$.

The vapors and gases pass off through a pipe 37 which has a condensation bend 38 where the water is condensed and any remaining HCl is thus taken off in solution and then the chlorine gas passes through pipe 39 into a tower 40. This is a wooden tower lined with lead and filled with coke, and sprayed with water to cleanse the gases and absorb any remaining HCl. Thence the gases pass through pipe 41 into a similar tower 42 which is sprayed with sulphuric acid to dry the gases. Thence the gases are lead to a retort 43 which is heated by any suitable means to a temperature of about red heat, (say about 600° C. or more). And into this retort is also introduced carbon and the $Al_2O_3$ that has been produced in retorts 10 when the dehydrated aluminum sulphate has been broken up by heat. The carbon and $Al_2O_3$ are ground and thoroughly mixed to give intimate contact and briquetted if found desirable to prevent being carried over mechanically into the condensing chamber. The following reaction then takes place:

VII. 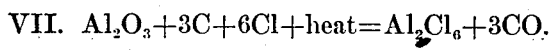 $Al_2O_3 + 3C + 6Cl + heat = Al_2Cl_6 + 3CO$.

The result is the production of carbon monoxide gas and anhydrous aluminum chloride in vapor form. This aluminum chloride as fume passes into a sublimating chamber 44 where the aluminum chloride sublimes and the carbon monoxide passes off through a pipe 45. This carbon monoxide may be used, for instance, as fuel in any of the various furnaces.

It may be desirable to control the temperature of the aluminum chloride so as to control its final physical form; and in Fig. 2 we have shown one form of apparatus suitable for that purpose. The chloride vapors from retort 43 enter a chamber 56 through pipe 55. This chamber has a brick top 51 heated by a heating jacket 52 receiving waste gases from combustion under the retort, and whose temperature may be controlled by any suitable damper arrangement, for instance. The conical bottom 50 of chamber 56 is steam jacketed at 57, steam (or other vapor) being admitted at 58 and exhausted through a trap at 59. By controlling the pressure any selected temperature may be maintained at the conical floor of chamber 56. A revoluble scraper 60 serves to scrape the chloride off floor 50 to drop through outlet 62 into receiver 63. The residual gases (CO) pass out through 14. Cool inert gases (for instance, $CO$ or $N$) may be introduced at 65. Typical operations follow:

(a) Pass cool gas through 52, air cool the jacket 57 and introduce cool gas at 65, and then all or practically all the chloride will be sublimated in finely divided form.

(b) Heat top of chamber so that inside temperature is above the boiling point of the chloride, which is about 183° C. Floor 50 is maintained slightly below the melting point (178° C.); and then the major portion of the chloride will be thrown down as a crystal.

Summing up this method it will be seen that we use as initial materials aluminum sulphate or sulphate bearing ores, etc. (Equation I); sodium chloride (Equation V); and carbon (Equation VII). The ultimate products are sodium sulphate (Equation V); aluminum chloride (Equation VII); and carbon monoxide (Equation VII). The ultimate thing that is done is the chlorination of the oxide obtained by dehydrating and decomposing aluminum sulphate. In this particular method we obtain the chlorine for the chlorination from hydrochloric acid which in turn is formed by sulphuric acid and sodium chloride, and the sulphuric acid is formed from the sulphur dioxide and oxygen (and/or $SO_3$) that are driven off when the aluminum sulphate is reduced to aluminum oxide.

At this point we may mention a variation that may be carried on in this method. For instance, we have found that if an atmosphere of $SO_3$ is maintained in the initial retort 10 and held under a suitable pressure (we have found a pressure of about twelve pounds above atmosphere to be sufficient at the temperature we have employed) then, instead of the product being aluminum oxide and sulphur dioxide and oxygen, the product is aluminum oxide and $SO_3$ (a temperature of about red heat is maintained and the pressure keeps the $SO_3$ from breaking up). Under these conditions the next operation (Equation III) may be dispensed with; and the $SO_3$ may then immediately be put into the operation represented by Equation IV to form sulphuric acid as has been touched upon before. Or the $SO_3$ (or the $SO_2$ and O) may be put directly into the operation represented by Equation V, into retort 30 along with the sodium chloride and water to form sodium sulphate and hydrochloric acid; thus $3SO_3 + 3H_2O + 6NaCl + heat = 6HCl + 3Na_2SO_4$; or; $3SO_2 + 3O + 3H_2O + 6NaCl + heat = 6HCl + 3Na_2SO_4$. Furthermore, it is possible here to dispense with the water and thus to obtain sodium sulphite and chlorine direct instead of sodium sulphate and HCl and thus the next step (Equation IV) and the step of Equation VI may be dispensed with. Thus: $SO_3$ (or $SO_2 + O$) $+ NaCl = NaSO_3 + Cl$. Or the same operations, with the sulphur-oxygen content and sodium chloride in different proportions will result as follows:

$3SO_3 + 6NaCl + 3O = 6Cl + 3Na_2SO_4$ or; $3SO_3 + 2NaCl = Na_2S_2O_7 + SO_2 + Cl_2$.

$Na_2S_2O_7$ equals $Na_2SO_4$ plus $SO_3$; which last $SO_3$ may be put back into this same operation or may be used, as pointed out at another place herein, to produce more sulphate for the process. Or:

$3SO_3 + 2NaCl = Na_2S_2O_7 + SO_2Cl_2$;
$SO_2Cl_2 = SO_2 + Cl_2$.

These procedures, like all the others as we have pointed out, may use other chlorides; we simply use sodium as an illustration.

Generally speaking, we find that as our process involves the chlorination of aluminum oxide obtained by decomposition of dehydrated aluminum sulphate, we can carry on the operations at much lower temperatures than any other process of which we are aware; and we find also that such decomposed sulphate lends itself very readily to easy chlorination. It will be understood that in all forms of our process, anhydrous aluminum sulphate may be the starting point of our actual operations; the sulphate may be dehydrated previously.

Method 2.

In this method we dehydrate and break up the aluminum sulphate in the same manner as before described:

I. $Al_2(SO_4)_3$ 18$H_2O$ plus heat equals $Al_2(SO_4)_3$ plus 18$H_2O$.

II. $Al_2(SO_4)3$ plus heat equals $Al_2O_3$ plus $3SO_2$ plus 3O (or equals $Al_2O_3$ plus $3SO_3$.

Then as the next step we introduce the sulphur dioxide, and oxygen gases, with or without extra oxygen, and water (steam) and the sodium chloride into a heating chamber (such for instance as shown at 30) with the result of forming hydrochloric acid and sodium sulphate as follows:

IIIa. $3SO_2 + 3O + air + 3H_2O + heat + 6NaCl = 6HCl + 3Na_2SO_4$.

This brings us to the same point as at the end of Equation 5 in method 1. The remaining operations are the same as in method 1 as follows:

VI. $6HCl + 3C + catalyzer = 6Cl + 3H_2O$;
VII. $Al_2O_3 + 6Cl + 3O = Al_2Cl_6 + 3CO$.

It will be seen that this variation from method 1 is somewhat similar to the variation previously explained for method 1, in that the sulphur dioxide and oxygen from the breaking up of the aluminum sulphate are put directly into reaction with water and the sodium chloride without the intervening formation of sulphuric acid; and the retort 10 in this second method may be operated, as previously described, to produce sulphur trioxide.

We may say here, that in the operation of retorts 30 we may arrange and connect them so that the gases are passed through several in series, one cylinder being always disconnected from the series line to remove spent material and to charge afresh. The fresh cylinder is then connected into first position in the line. In this way almost complete reactions may be obtained.

Further, with regard to any of the methods here explained, the carbon may be introduced to the system in retort 10 instead of in the last retort, and may, in any case, be introduced in gaseous, liquid or solid form. After the sulphate has been decomposed it may be sprayed with hydrocarbons in any retort and thereby impregnated with carbonaceous matter, or the oxide may be sprayed with oil vapors, the retort being kept hot enough to decompose the vapors and deposit carbon. Then this impregnated oxide may be taken to retort 43; or the last reaction may, if desired, be carried on in retort 10 by introducing the chlorine there. If the oil or oil vapors are introduced into the same retort that the chlorine is subsequently passed into, the excess of oil vapors may be removed, before introducing chlorine, by passing a neutral gas through the retort. And, in fact, by having a sufficient number of retorts 10, the last reaction (VII) may be carried on there in any of the methods here described, and, the temperature of the oxide in retort 10 being about the same as that required for chlorination, that same temperature may be maintained, and the carbon and chlorine introduced and chlorination accomplished, without the necessity of reheating the oxide. Wherever the last reaction is carried on, the oxide may be impregnated with carbon as here described, either previous to or during the introduction of chlorine. Furthermore, we may so impregnate the oxide with hydrocarbon liquids or vapors somewhat in excess of the chlorine reaction requirements; and then the final chloride product will contain some condensed oil and be somewhat sticky and cokey and semiliquid, less liable to deterioration, but not at all objectionable for use in oil distilling processes.

Although we thus prefer to use hydrocarbons, as is specifically the subject matter of application "A", to supply the carbon for the chlorination step; so far as the general aspect of our process is concerned we may use any form of carbon, or any carbon carrying gas may be substituted for hydrocarbon gas or vapor.

Method 6.

In this method steps I, II, III, IV, and VII are the same as in method 1, or any of its variations where $H_2SO_4$ or S and O are produced. That is, we dehydrate and decompose the sulphate, and form sulphuric acid. Then $H_2SO_4$ from step 4 is used to produce $Al_2(SO_4)_3 \cdot 18H_2O$ from clay or other aluminium oxide bearing ore such as bauxite or kaolin, as follows:

$Al_2O_3 \cdot SiO_2 + 3H_2SO_4 + 18H_2O = Al_2(SO_4)_3 \cdot 18H_2O + 3H_2SiO_3.$ The clay specified above—an ordinary clay—may be desirably dehydrated to carry on this reaction. It would be usual to calcine it. Or, instead of forming $H_2SO_4$ in step 4, the $SO_2$ and O or the $SO_3$ may be put directly with the silicate to form the sulphate, as follows:

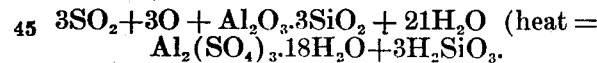
$Al_2(SO_4)_3 \cdot 18H_2O + 3H_2SiO_3.$

In either case the result is the production of more aluminum sulphate to be put into the process. This peculiarity of the process is the specific subject matter of identified application "D"; but it will be seen that this specific procedure, may be carried out in connection with the claimed processes of this application. A part of the sulphuric acid or the S and O content may be used to produce more sulphate for the process, while the remaining S and O content is used to produce the chlorinating agent. This specific procedure is also capable of variations but those are set out in said application "D".

As an illustration of the application of this process to original materials other than pure aluminum sulphate, we will give an illustration of this application to alunite. It will be understood of course, from what we have said, that the process may be applied to various ores that carry aluminum sulphate, together with other things, whether chemically combined with the sulphate or not. Alunite is a good illustration of a material wherein the aluminum sulphate is chemically combined with other compounds. The formula for alunite may be written.

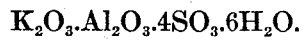

This ore is heated as hereinbefore described to such a temperature as to dehydrate it and as to drive off the $SO_3$ content which is not united with the $K_2O$ content. The ore may be looked upon as being a double sulphate of potassium and aluminum; and the $SO_3$ content of the aluminum sulphate is driven off. As a result of such heating, which may be carried on in such retorts as indicated at 10 in the drawings, and as hereinbefore referred to, there remains a substance that is made up of aluminum oxide and soluble potassium sulphate. The potassium sulphate is then leached out of the calcined residue; and then the remaining aluminum oxide is again dried before it is mixed with the proper proportion of carbon and chlorinated. The chlorination may be carried on in any of the manners hereinbefore described. It will be seen that the operations on alunite are thus substantially what they are on aluminum sulphate alone, only with the addition of leaching out the potassium sulphate and re-drying the oxide.

Furthermore chlorine for the chlorination operation may be obtained, in any of the various manners hereinbefore described, by using the $SO_3$ content of the original ore that has been driven off in the decomposing operation. It will not be necessary to go into the details of these steps as they have been fully described before. Other characteristic aluminum and sulphur carrying ores that may be used in the process are

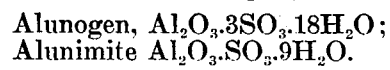

It will be understood that, although we have here now stated various forms of process, that we have given these various forms by way of illustration only; and that the process may be varied in other manners and still be within the scope of the invention as expressed in the subjoined claims. For instance, various combinations or arrangements of the various steps herein set out may be made by selecting certain steps from the one or more of the methods herein stated and certain other steps from one or more of other methods herein stated; but it is unnecessary and would be burdensome to specifically state all of the possible methods that might be thus worked out.

Having described a preferred form of our invention, we claim:

1. A process that includes decomposing aluminum sulphate to separate its aluminum oxide content from its sulphur-oxygen content, using the sulphur-oxygen content for the production of a chlorinating agent, and chlorinating the oxide with that agent.

2. A process that includes decomposing aluminum sulphate to separate its aluminum oxide content from its sulphur-oxygen content, forming a chlorinating agent by reactions using a chloride and the sulphur-oxygen content, and chlorinating the oxide with that agent.

3. A process that includes decomposing aluminum sulphate to separate its aluminum oxide content from its sulphur-oxygen content, forming hydrochloric acid by reactions using a chloride and the sulphur-oxygen content, and chlorinating the oxide with chlorine made from the hydrochloric acid.

4. A process that includes decomposing dehydrated aluminum sulphate to separate aluminum oxide and the sulphur-oxygen content; forming hydrochloric acid by reactions using the sulphur-oxygen content and water and a chloride; and chlorinating the aluminum oxide with chlorine produced from the hydrochloric acid to form anhydrous aluminum chloride.

5. A process that includes decomposing dehydrated aluminum sulphate into aluminum oxide and its sulphur-oxygen content, causing the sulphur oxygen content to react with a chloride and $H_2O$ to form HCl, and chlorinating the oxide with chlorine made from the HCl to form anhydrous aluminum chloride.

6. A process that includes decomposing dehydrated aluminum sulphate into aluminum oxide and a sulphur-oxygen compound, causing the sulphur-oxygen compound to react with a chloride and $H_2O$ to form HCl, and chlorinating the oxide with chlorine made from the HCl to form anhydrous aluminum chloride.

7. A process that includes decomposing dehydrated aluminum sulphate to aluminum oxide and sulphur dioxide and oxygen; forming hydrochloric acid by reactions using the sulphur dioxide, oxygen, water, and sodium chloride; and chlorinating the aluminum oxide with chlorine produced from the hydrochloric acid, to form anhydrous aluminum chloride.

8. A process that includes decomposing dehydrated aluminum sulphate into aluminum oxide and its sulphur-oxygen content, forming sulphuric acid from the sulphur-oxygen content and water, forming hydrochloric acid by reaction between the sulphuric acid and a chloride, and chlorinating the formed oxide with chlorine made from the hydrochloric acid to form anhydrous aluminum chloride.

9. A process that includes decomposing dehydrated aluminum sulphate into aluminum oxide, sulphur dioxide and oxygen; combining the sulphur dioxide and oxygen to form sulphur trioxide, forming hydrochloric acid by reaction between the sulphur trioxide, water and sodium chloride, and chlorinating the aluminum oxide with chlorine produced from the hydrochloric acid, to form anhydrous aluminum chloride.

10. A process that includes decomposing dehydrated aluminum sulphate into aluminum oxide, sulphur dioxide and oxygen; combining the sulphur dioxide and oxygen to form sulphur trioxide, combining the sulphur trioxide with water to form sulphuric acid, and combining the sulphuric acid with sodium chloride to form sodium sulphate and hydrochloric acid; and chlorinating the aluminum oxide with chlorine made from the hydrochloric acid, to form anhydrous aluminum chloride.

In witness that we claim the foregoing we have hereunto subscribed our names this 7th day of June, 1923.

HENRY I. LEA.
CLIFFORD W. HUMPHREY.